US009791050B2

United States Patent
Muzzo (10) Patent No.: US 9,791,050 B2
(45) Date of Patent: Oct. 17, 2017

(54) GAS SHUT-OFF DEVICE (71) Applicant: Luxembourg Patent Company S.A., Lintgen (LU)

(72) Inventor: Paul Muzzo, Yutz (FR)

(73) Assignee: Luxembourg Patent Company S.A., Luxembourg (LU)

( * ) Notice: Subject to any disclaimer, the term of this patent is extended or adjusted under 35 U.S.C. 154(b) by 0 days.

(21) Appl. No.: 14/917,668

(22) PCT Filed: Sep. 26, 2014

(86) PCT No.: PCT/EP2014/070632
§ 371 (c)(1),
(2) Date: Mar. 9, 2016

(87) PCT Pub. No.: WO2015/044355
PCT Pub. Date: Apr. 2, 2015

(65) Prior Publication Data
US 2016/0215890 A1    Jul. 28, 2016

(30) Foreign Application Priority Data

Sep. 27, 2013  (LU) .......................................... 92288

(51) Int. Cl.
*F16K 1/30* (2006.01)
*F17C 13/04* (2006.01)

(52) U.S. Cl.
CPC .............. *F16K 1/304* (2013.01); *F16K 1/306* (2013.01); *F17C 13/04* (2013.01);
(Continued)

(58) Field of Classification Search
CPC ........... F16K 1/304; F16K 1/306; F17C 13/04
See application file for complete search history.

(56) References Cited

U.S. PATENT DOCUMENTS

| | | |
|---|---|---|
| 3,005,577 A | 10/1961 | Webster |
| 3,704,813 A | 12/1972 | Devol |

(Continued)

FOREIGN PATENT DOCUMENTS

| | | |
|---|---|---|
| DE | 29923282 U1 | 8/2000 |
| EP | 0252379 A1 | 1/1988 |

(Continued)

OTHER PUBLICATIONS

International Search Report from corresponding International Application No. PCT/EP2014/070632, dated Dec. 17, 2014.

*Primary Examiner* — Kevin Lee
(74) *Attorney, Agent, or Firm* — Polster Lieder (57) ABSTRACT

The invention is directed to a valve for a compressed gas cylinder, comprising: a valve body with an inlet, an outlet and a passage connecting the inlet with the outlet; a shut-off device of the passage with an actuating pin extending in the passage; a check-valve between the shut-off device and the inlet, the check valve comprising a seat and a movable closing member initially held at a position distant from the seat by contact with a guiding surface and movable past the position by the pin so as to cooperate with the seat and prevent a refilling flow of gas from the outlet to the inlet. The guiding surface is on a tubular portion fixed to the valve body and comprising at least one radial aperture so as to allow the refilling flow of gas to by-pass the closing member when in the distant position.

20 Claims, 4 Drawing Sheets

(52) U.S. Cl.
CPC .. *F17C 2201/032* (2013.01); *F17C 2201/058* (2013.01); *F17C 2203/0617* (2013.01); *F17C 2205/0335* (2013.01); *F17C 2205/0385* (2013.01); *F17C 2205/0394* (2013.01); *F17C 2223/0123* (2013.01); *F17C 2260/013* (2013.01); *F17C 2260/028* (2013.01)

(56) References Cited

U.S. PATENT DOCUMENTS

| | | | | |
|---|---|---|---|---|
| 4,290,440 | A * | 9/1981 | Sturgis | F16K 17/383 137/75 |
| 4,763,690 | A * | 8/1988 | Martin | F16K 31/1221 137/613 |
| 5,131,625 | A | 7/1992 | Hacker et al. | |
| 6,557,592 | B2 * | 5/2003 | Nagel | F16K 1/306 141/100 |
| 6,871,802 | B2 * | 3/2005 | Stilwell et al. | F16K 1/305 169/19 |
| 6,929,028 | B2 * | 8/2005 | Larsen et al. | F16K 1/305 137/505.25 |
| 6,932,238 | B2 * | 8/2005 | Baker | B65D 47/02 215/19 |
| 2003/0029508 | A1 | 2/2003 | Raboin | |
| 2004/0144803 | A1 | 7/2004 | Baker | |

FOREIGN PATENT DOCUMENTS

| | | |
|---|---|---|
| EP | 0401072 A1 | 12/1990 |
| EP | 0768485 A1 | 4/1997 |
| FR | 2655955 A1 | 6/1991 |
| WO | 2012107714 A1 | 8/2012 |

* cited by examiner

GAS SHUT-OFF DEVICE

CROSS-REFERENCE TO RELATED APPLICATIONS

The present invention is the US national stage under 35 U.S.C. §371 of International Application No. PCT/EP2014/070632, which was filed on Sep. 26, 2014, and which claims the priority of application LU 92288 filed on Sep. 27, 2013, the content of which (text, drawings and claims) are incorporated here by reference in its entirety.

FIELD

The invention is directed to a gas valve for compressed gas cylinders, more particularly for non-refillable compressed gas cylinders.

BACKGROUND

Prior art patent document published U.S. Pat. No. 3,704,813 discloses a gas valve for compressed gas cylinders that prevents refilling. FIG. 2 of this document discloses a cylinder valve with a shut-off device, a pressure relief device and a check valve preventing refilling of the cylinder. The shut-off and pressure relief devices are combined and open when a refilling flow of gas is applied. The check valve comprises a ball held at a position distant from its seat by means of spring finger detents. The combined shut-off and pressure relief devices comprise a pin extending out of the valve body for actuating the shut-off device. Upon an opening stroke beyond a predetermined limit, the movable closing member of the shut-off device contacts the ball and pushes it beyond its holding position distant from the seat. The ball is then freed and can cooperate with its seat to prevent refilling of the cylinder after the first use of the gas. FIG. 3 of this document discloses an alternative design where the pressure relief device is separate from the shut-off device, the principle of the check valve operated by the first opening of the shut-off device remaining the same. In both designs, the spring finger detents restrict the available cross area for the check valve spring. Additionally, under certain circumstances the assembling operations of the check valve might be rendered difficult in that the ball might tend to escape from its seat on the finger detents. Also, both designs require much space laterally.

Prior art patent document published US 2003/0029508 A1 discloses, similarly to the previous document, a gas valve for compressed gas cylinders that prevents refilling. The passage in the valve body is generally cylindrical and comprises on its internal surface detents like a pair of diametrically opposed dimples extending towards each other. The ball of the check valve rests therefore on these detents as long as the pin of the shut-off device does not push it past the detents. The body is in principle made of metallic material and the drawings show that the detents are intended to be made by plastic deformation of the valve body on its external surface. The ball must therefore be resilient enough for being able to pass beyond the detents when urged by the shut-off device pin. To that end, the ball can be made of elastomeric material. The use of such a material can cause problems with the reliability of the check valve and its compatibility with high pressures. The effort necessary for having the ball passing the detents might be high and cause some difficulties for the persons manipulating the cylinder. Additionally, even though the assembly appears to be quite easy, the shut-off device is a valve core that is screwed into the passage of the body. This means that this design requires some space laterally and also might increase the production costs.

Prior art patent document published US 2004/0144803 A1 discloses a non-refillable valve including a body, a gas inlet, a gas outlet and a passage connecting the outlet with the inlet. The valve comprises also a shut-off device of the passage with an actuating pin extending in the passage. The pin comprises a shoulder portion bearing a first circular gasket that cooperates with a seat in the passage, so as to close the passage. The valve comprises also a second circular gasket fixed to the body around the gas passage downstream of the seat cooperating with the first circular gasket. The pin is able to slide in a gas tight manner along the second circular gasket. The pin comprises an axial central bore opened on the outlet side of the valve and a radial aperture connecting the central bore with the passage between the first and second gaskets. The gas passage comprises also upstream of the shut-off device an axially extending internal chamber. A plug member is secured within the chamber to provide a fluid flow passage between the container and the body chamber when the body is secured to the container, and an elastic sealing member is also disposed within the chamber. The sealing member is displaceable from a first position to a second position within the chamber, where the sealing member in the first position permits fluid flowing for refilling the container, i.e. from the outlet to the inlet of the valve, and the sealing member in the second position substantially prevents fluid flow in the refilling direction. The valve pin is configured to mode the sealing member from the first position to the second position. This valve is interesting in that it has a reduced number of parts and provides an anti-refilling function. It has however the drawback that the first gasket movable with the pin come into contact with a potentially sharp angle of the seat. This results from the relatively simple construction of the pin.

SUMMARY

The invention has for technical problem to provide an improved valve for compressed gas cylinder. More particularly, an objective of the invention is to provide a valve that is more reliable, easier and cheaper to manufacture and that is more compact.

The invention is directed to a valve for a compressed gas cylinder, comprising: a valve body with an inlet, an outlet and a passage connecting the inlet with the outlet; a shut-off device of the passage with an actuating pin extending in the passage, a movable shut-off closing member, a shut-off seat in the passage and a spring urging the closing member towards the seat in the direction of service gas flow from the inlet to the outlet; wherein the pin is attached to the movable shut-off closing member.

According to various embodiments of the invention, the shut-off device seat is formed by a toroid elastomer gasket housed in an annular recess in the body, the pin extending through and being in contact with the gasket.

According to various embodiments of the invention, the main direction of the cross-sectional profile of the annular recess in the body forms with the longitudinal axis an angle α comprised between 20° and 70°, for example between 30° and 60°, and is generally directed to the outlet.

According to various embodiments of the invention, the annular recess is formed in a bevelled section of a cavity forming the gas passage.

According to various embodiments of the invention, the movable shut-off device closing member comprises a sleeve with a front end contacting the shut-off device seat.

According to various embodiments of the invention, the pin traverses the sleeve and is rigidly fixed thereto, for example by screwing.

According to various embodiments of the invention, the pin comprises a shoulder abutting an internal shoulder in the sleeve.

According to various embodiments of the invention, the pin comprises an annular slot housing a gasket in contact with an internal surface of the sleeve.

According to various embodiments of the invention, the pin comprises an axial central bore extending from an open end forming the outlet to an intermediate position, and at least one transversal aperture connecting the bore with a chamber between the sleeve and the pin.

According to various embodiments of the invention, the sleeve comprises an external shoulder designed for abutting an internal shoulder in the passage when the movable shut-off device closing member contacts and deforms the shut-off device seat beyond a predetermined stroke.

According to various embodiments of the invention, the valve comprises a check-valve between the shut-off device and the inlet, the check valve comprising a seat and a movable closing member initially held at a position distant from the seat by contact with a guiding surface and movable past the position by the pin so as to cooperate with the seat and prevent a refilling flow of gas from the outlet to the inlet.

According to various embodiments of the invention, the guiding surface is on a tubular portion attached to the valve body and comprising at least one radial aperture so as to allow the refilling flow of gas to by-pass the closing member when in the distant position.

According to various embodiments of the invention, the tubular portion is on a plug comprising the check valve seat and the inlet, the plug being screwed on the valve body.

According to various embodiments of the invention, the passage comprises an axially elongated cavity that is closed at one end by the plug, the cavity being larger than the tubular portion so as to form an annular chamber around the portion for feeding the aperture(s).

According to various embodiments of the invention, the check valve closing member is held in the position distant from the check valve seat essentially by friction with the guiding surface.

According to various embodiments of the invention, the guiding surface is generally cylindrical at the position where the check valve closing member is distant from the check valve seat.

According to various embodiments of the invention, the check valve closing member is ball-shaped.

According to various embodiments of the invention, the check valve closing member has a bevelled front face directed to the check valve seat and a generally cylindrical end face opposed to the front face.

According to various embodiments of the invention, the check valve comprises a spring slip on the cylindrical end face of the check valve closing member and abutting the shut-off device.

According to various embodiments of the invention, the check valve and the shut-off device are configured so that the shut-off device opens and the check valve movable closing member keeps held in its initial distant position when the pin is moved on a partial stroke and the shut-off device opens further and the check valve movable closing member is pushed beyond and freed from its distant position when the pin is moved on a full stroke.

The invention can also be directed to a valve for a compressed gas cylinder, comprising: a valve body with an inlet, an outlet and a passage connecting the inlet with the outlet; a shut-off device of the passage with an actuating pin extending in the passage; a check-valve between the shut-off device and the inlet, the check valve comprising a seat and a movable closing member initially held at a position distant from the seat by contact with a guiding surface and movable past the position by the pin so as to cooperate with the seat and prevent a refilling flow of gas from the outlet to the inlet; wherein the guiding surface is on a tubular portion fixed to the valve body and comprising at least one radial aperture so as to allow the refilling flow of gas to by-pass the closing member when in the distant position.

According to various embodiments, the tubular portion is on a plug comprising the check valve seat and the inlet, the plug being screwed on the valve body.

According to various embodiments, the valve body comprises an axially elongated cavity that is closed at one end by the plug, the cavity being larger than the tubular portion so as to form an annular chamber around the portion for feeding the aperture(s).

According to various embodiments, the check valve closing member is held in the position distant from the check valve seat essentially by friction with the guiding surface.

According to various embodiments, the guiding surface is generally cylindrical at the position where the check valve closing member is distant from the check valve seat.

According to various embodiments, the check valve closing member has a bevelled front face directed to the check valve seat and a generally cylindrical end face opposed to the front face.

According to various embodiments, the check valve comprises a spring slip on the cylindrical end face of the check valve closing member and abutting the shut-off device.

According to various embodiments, the shut-off device comprises a movable shut-off closing member and a shut-off seat in the passage and a spring urging the closing member towards the seat in the direction of service gas flow from the inlet to the outlet.

According to various embodiments, the pin is attached to the movable shut-off closing member and extends in one direction towards the check valve and in the opposite direction past the shut-off device seat.

According to various embodiments, the shut-off device seat is formed by a toroid elastomer gasket housed in an annular recess in the body, the pin extending through and being in contact with the gasket.

According to various embodiments, the main direction of the cross-sectional profile of the annular recess in the body forms with the longitudinal axis an angle between 20° and 70°, for example between 30° and 60°, and is generally directed to the outlet.

According to various embodiments, the annular recess is formed in a bevelled section of a cavity forming the gas passage.

According to various embodiments, the movable shut-off device closing member comprises a sleeve with a front end contacting the shut-off device seat.

According to various embodiments, the pin traverses to the sleeve and is rigidly fixed thereto, for example by screwing.

According to various embodiments, the pin comprises a shoulder abutting an internal shoulder in the sleeve.

According to various embodiments, the pin comprises an annular slot housing a gasket in contact with an internal surface of the sleeve.

According to various embodiments, the pin comprises an axial central bore extending from an open end forming the outlet to an intermediate position, and at least one transversal aperture connecting the bore with a chamber between the sleeve and the pin.

According to various embodiments, the sleeve comprises an external shoulder designed for abutting an internal shoulder in the passage when the movable shut-off device closing member contacts and deforms the shut-off seat beyond a predetermined stroke.

According to various embodiments, the check valve and the shut-off device are configured so that the shut-off device opens and the check valve movable closing member keeps held in its initial distant position when the pin is moved on a partial stroke and the shut-off device opens further and the check valve movable closing member is pushed beyond and freed from its distant position when the pin is moved on a full stroke.

The invention is particularly interesting in that it provides a valve for a non-refillable cylinder with several improvements. Indeed, the fact of providing a movable shut-off closing member that is a separate part from the pin provides more freedom for the choice of its shape and material. It permits also to have a gasket fixed with the body and the shut-off closing member cooperating directly with the gasket. This latter can also be housed in a recess with a favourable geometry and avoiding sharp edges. The efforts necessary for manipulating the valve are reduced and better controlled. Also the reliability of the valve is improved for it provides more freedom in the material and shape of the check valve closing member and the corresponding seat. The production costs and assembly of the valve are also improved. The claimed valve contains few parts that can all be mounted on a single side of the valve body. Also the tubular portion with the guiding surface can be produced separately, possible in a material different from the valve body.

DETAILED DESCRIPTION

Figure 1:
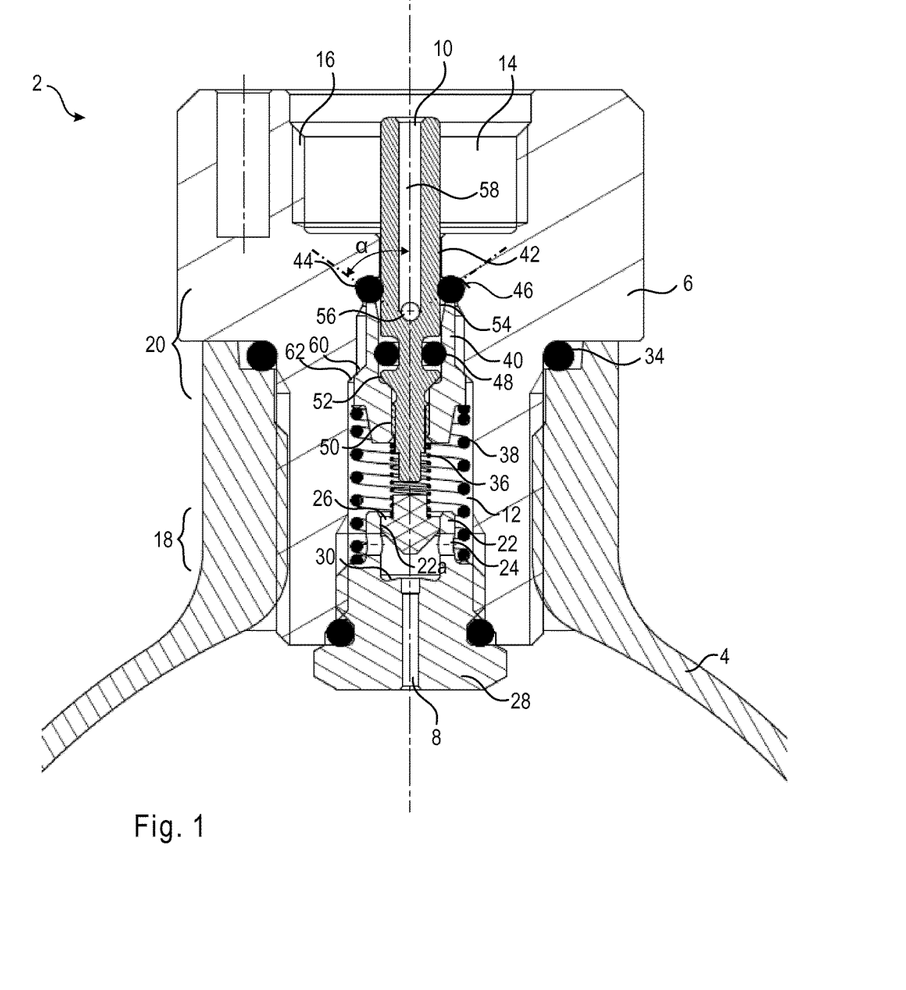
FIG. 1 is a cross sectional view of a valve, the valve being mounted on a cylinder and in a shut-off state, in accordance with various embodiments of the present invention.
Figure 2:
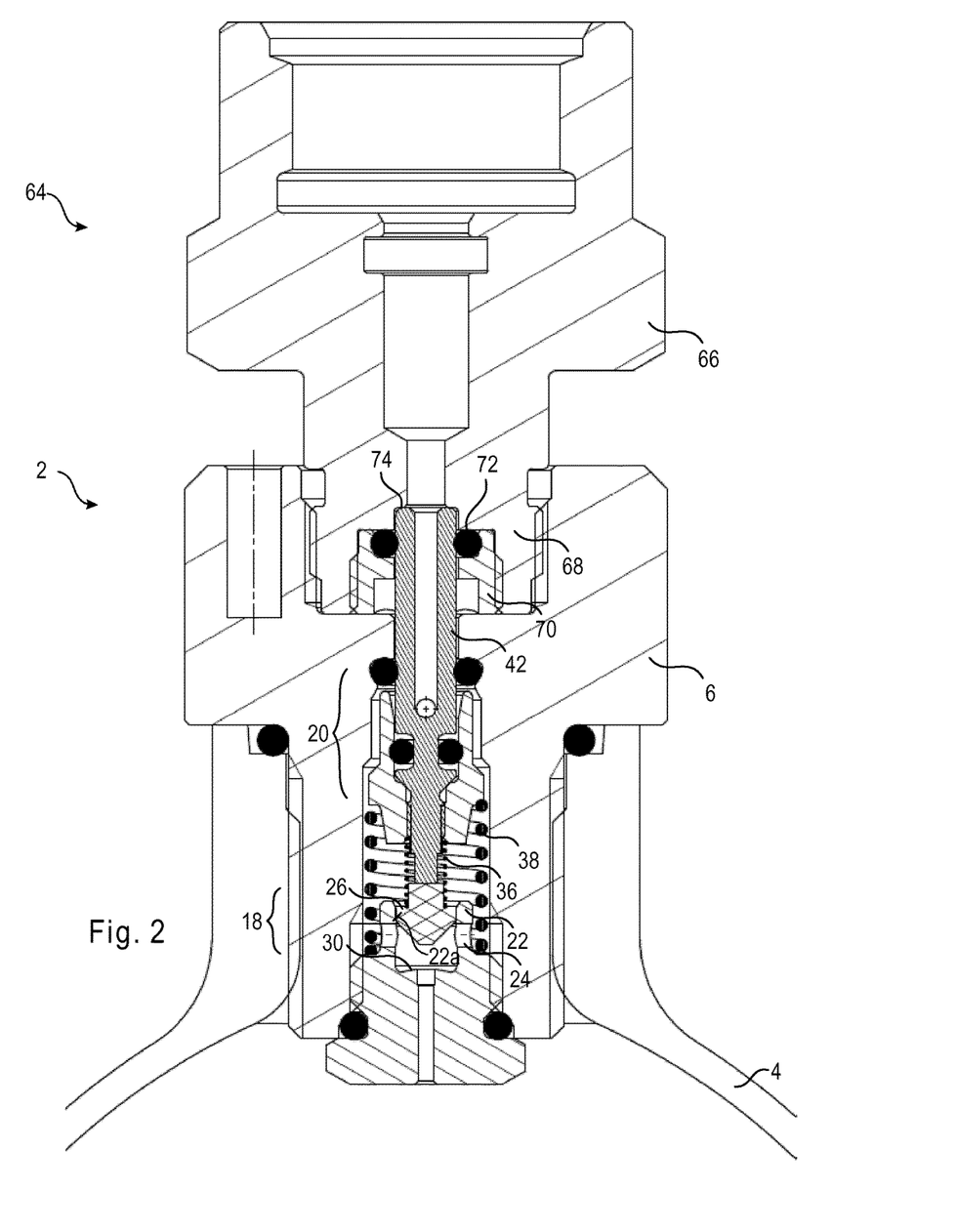
FIG. 2 illustrates the valve of FIG. 1 during filling of the cylinder, in accordance with various embodiments of the present invention.
Figure 3:
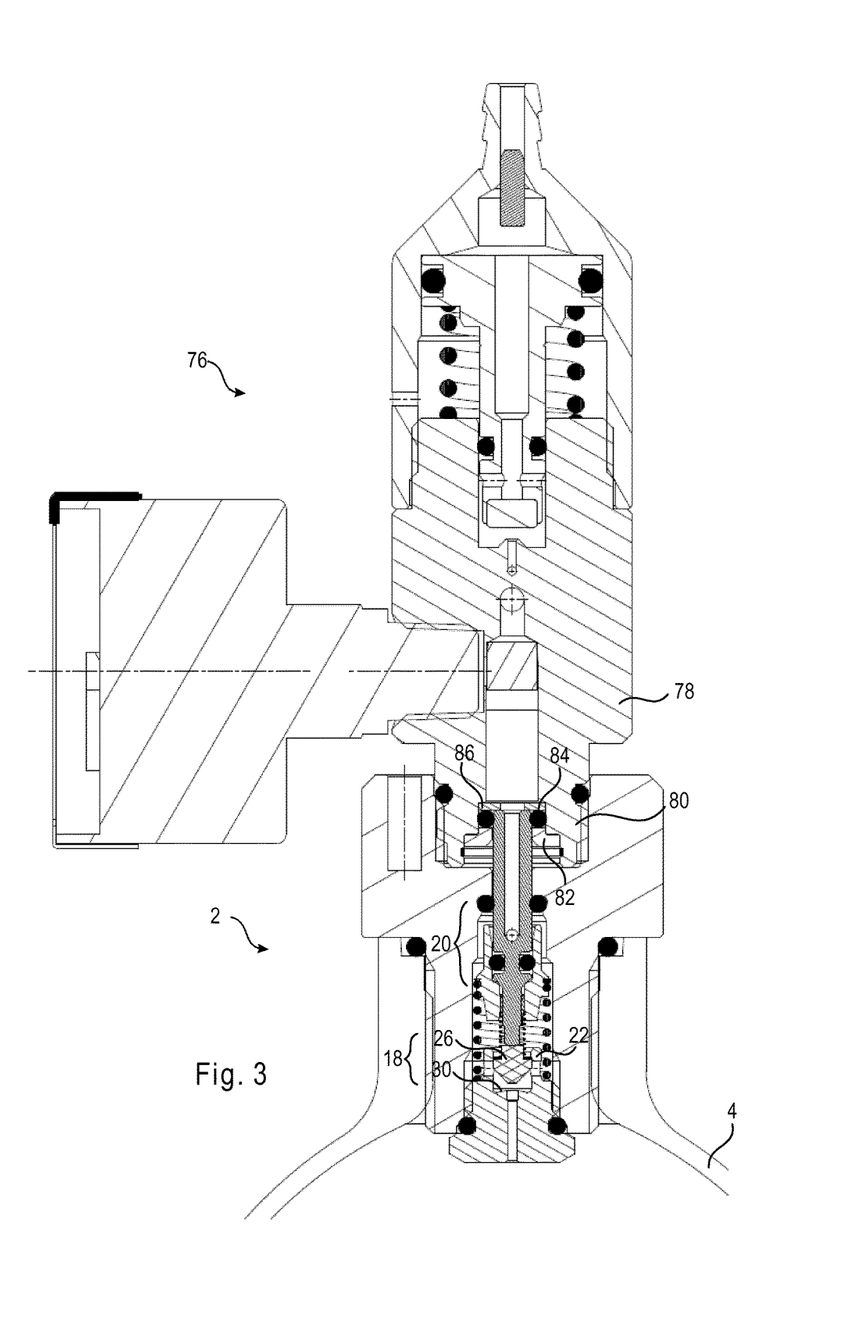
FIG. 3 illustrates the valve of FIGS. 1 and 2 when in service, in accordance with various embodiments of the present invention.
Figure 4:
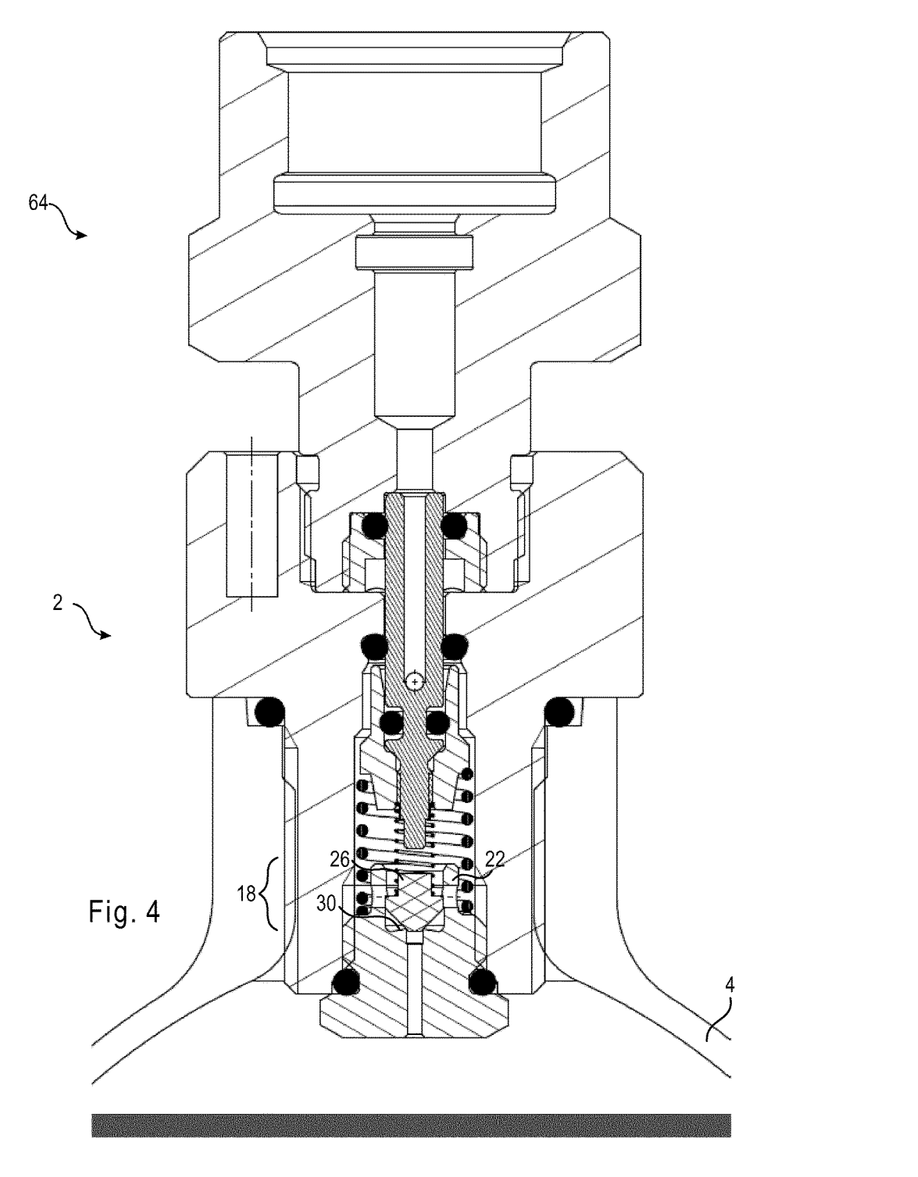
FIG. 4 illustrates the valve of FIGS. 1 to 3 when trying to refill the cylinder after having been in service, in accordance with various embodiments of the present invention.

FIGS. 1 to 4 illustrate a valve in accordance with the invention mounted on a compressed gas cylinder. FIG. 1 illustrates the valve in a shut-off state, FIG. 2 illustrates the valve when refilling the cylinder, FIG. 3 illustrates the valve in service and FIG. 4 illustrates the valve when attempting to refill the cylinder.

The valve 2 illustrated in FIG. 1 is mounted by screwing on the neck of a compressed gas cylinder 4. The valve 2 comprises a body or housing 6 with an inlet 8, an outlet 10 and a passage 12 connecting the inlet 8 with the outlet 10. The passage 12 extends essentially longitudinally through the whole body 6. This latter comprises a bore 14 at its upper end on the outlet side, this bore 14 comprising an internal thread 16 for securing a connector for filling the cylinder 4, as will be described in connection with FIGS. 2 and 4, or a pressure regulator, as will be described in connection with FIG. 3.

The passage 12 in the body 6 forms a cavity in which a check valve 18 and a shut-off device 20 are mounted.

The check valve 18 comprises a movable closing member 26 that is guided by a guiding surface 22a on a tubular portion 22 that is part of a plug 28 screwed at the lower open end of the passage 12. A seat 30 is formed on the plug 28 inside the tubular portion 22, and the movable closing member 26 is configured for cooperating with the seat 30 so as to prevent a flow of gas from the outlet to the inlet, i.e. a flow of gas corresponding to a refilling action of the cylinder 4. The inlet 8 corresponds to a bore through the plug 28 from its lower outer face to the seat 30.

The check valve 18 comprises also a spring 36 that exerts a resilient force on the movable closing member 26. This latter is held in position as illustrated in FIG. 1 distant from its seat 30 so as to allow a flow of filling gas to reach the inlet 8 and the cylinder 4. To that end, the tubular portion 22 comprises apertures 24 at a lower position than the closing member 26. The passage/cavity 12 is larger in diameter than the tubular portion 22 so as to provide an annular chamber around this portion and allow the filling flow of gas to reach and pass through the apertures and fill the cylinder.

The movable closing member 26 is held in position by frictional forces with its guiding surface 22a. To that end the diameter of the guiding surface 22a at its upper section is slightly less than the outer diameter of the closing member 26 so as to retain it in this position against the biasing force of the spring 36. In this position the front face of the closing member 26 is distant from the seat 30. The frictional forces are dimensioned so as to allow the movable closing member 26 to be pushed by the shut-off device past the upper section of the guiding surface 22a. The guiding surface 22a is such that when the closing member 26 is pushed past this position it can then freely slide along this surface until it contacts the seat 30 under the biasing force of the spring 36.

The front face of the closing member 26 can be bevelled or conical towards the seat 30. The rear face of the closing member 26 can be generally cylindrical with a shoulder so as to have the spring 36 slid on that face.

The movable closing member 26 can be made of plastic material. The tubular portion 22 can be made of metallic and/or plastic material.

The shut-off device 20 is placed above or downstream of the check valve 18. The shut-off device 20 comprises essentially a seat formed by an annular gasket 44 housed in an annular groove 46 of the body, and a sleeve 40 with a front surface contacting the gasket seat 44. The sleeve 40 is urged towards the seat 44 by a spring 38 resting at its opposite end on the plug 28.

The shut-off device 20 comprises also a pin 42 that traverses axially the sleeve 40. The pin 42 is rigidly attached to the sleeve by screwing 50. The pin 42 comprises to that end an external bevelled shoulder 52 contacting a corresponding internal shoulder of the sleeve 40. It comprises also a circular groove housing an annular gasket 48 contacting the internal surface of the sleeve 40 in a gas tight fashion.

The pin 42 contacts the gasket seat 44 of the shut-off device 20 so as to keep the gasket 44 in position in its groove 46. This latter is formed in a bevelled or conical internal surface of the passage 12. The cross-section of the groove 46 is generally circular with a main direction that is oriented laterally and upwardly. In other words, the cross-section of the groove 46 corresponds to about a half circle that has a main direction that forms with the longitudinal axis an angle α comprised between 20° and 70°, for example between 30° and 60°, and is generally directed to the outlet. This has for effect that the urging force of the spring 38 and/or of the pressurized gas on the sleeve 40 tends to keep the gasket 44 in place in its groove 46.

The sleeve 40 can comprise a shoulder external surface 60 distant from the front surface cooperating with the shut-off device seat 44. This sleeve is configured for contacting a corresponding shoulder surface 62 on the internal surface of the cavity 12. These surfaces are positioned so as to come into contact and limit the displacement of the sleeve 40 towards its seat when this latter has been deformed by a predetermined amount. This is particularly interesting in that this protects the shut-off device seat 44 from being damaged by permanent deformation or matting.

The internal surface of the sleeve 40, at the vicinity of its front surface cooperating with the shut-off device 20 seat, forms with the external surface of the pin 42 an annular chamber 54 that is directly downstream of the shut-off device 20 and in connection with an axial bore 58, the open of which forming the outlet 10. This connection is achieved by apertures(s) 56 extending essentially radially from the chamber 54 to the bore 58.

The assembly of the valve 2 is particularly advantageous in that all components are mounted on the inlet side. Indeed, after that the body 6 has been shaped (by forging, deformation and/or machining), the gasket 44 is put in place in its groove 46, in various implementations by means of a specific elongate tool (not represented) configured for holding and pushing the gasket into the groove 46. The sleeve 40 and pin 42 assembly can then be introduced into the passage/cavity 12 where the distal end of the pin 42 slides through the gasket 44. At least one of the springs 36 and 38 can be slid into the cavity and the plug 28 with the closing member 26 held in position in the tubular portion 22 can then be screwed into the cavity thereby ending the assembly process.

FIG. 2 illustrates the cylinder valve 2 of FIG. 1 when filling the cylinder 4. A filling connector 64 is coupled to the valve 2 so as to actuate the pin 42 and open the shut-off valve 20. The connector 64 comprises a body 66 with a front end 68 designed for being inserted in the cavity 14 (FIG. 1) of the valve 2. More particularly, the front end 68 comprises an external thread mating with the internal thread 16 (FIG. 1) of the valve. It comprises also a cavity with sealing means in the form of a gasket 72 housed in a plug 70 screwed into the cavity. This gasket 72 is configured for cooperating with the external surface of the pin 42 in a gas tight fashion. Additionally, the front end 68 of the connector 64 comprises a shoulder 74 abutting against the upper front surface of the pin when screwing the connector 64 on the valve 2, thereby moving the pin downwardly so as to open the shut-off device 20. The displacement of the pin 42 in this configuration corresponds to a part of the full stroke of the pin 42. As can be seen in FIG. 2, the lower end of the pin 42 hardly touches the check valve closing member 26, this latter remaining in its initial position distant from the check valve seat 30 by means of the frictional forces with the guiding surface 22a.

In the configuration of FIG. 2, the fill gas can flow through the shut-off valve 20 and also through the check valve 18 via the apertures 24. When the filling process is terminated, the connector can be removed so that the pin 42 moves upwardly against the biasing force of the spring 38 so as to close the shut-off device 20. The check-valve 18 remains then in its initial position distant from the seat 30.

FIG. 3 illustrates the valve 2 in service, i.e. with a pressure regulator 76 connected thereto for debiting gas in a desired reduced pressure and/flow range. The pressure regulator 76 comprises a body 78 with a front end 80 configured for engaging with the cavity 14 (see FIG. 1) of the valve, similarly to the front end of the filling connector illustrated in FIG. 2. More particularly, the front end 80 comprises a cavity housing a retainer 82 holding a gasket 84 which cooperates with the outer surface of the pin 42 in a gas tight fashion. The cavity comprises also a shoulder 86 with a washer abutting against the upper front surface of the pin 42. This abutting surface in the body of the regulator 76 is configured for lowering the pin 42 more than with the filling connector 66 (FIG. 2), so that the lower end of the pin pushes the check valve closing member 26 past its initial position towards the seat 30. The movable closing member 26 is then freed from the pressure contact against the guiding surface.

In FIG. 3 we can observe that the movable closing member 26 is distant from its seat 30 due to the pressure of the inlet gas flowing towards the outlet.

FIG. 4 illustrates the valve of FIGS. 1 to 3 in a configuration where it would be tried to refill the cylinder after having proceeded to withdrawal of gas as in the configuration of FIG. 3, i.e. by means of a connector that when coupled to the valve lowers the pin to its full stroke, i.e. a stroke that pushes the check valve closing member past its initial position so as to be freed from the frictional forces that held it in that position. FIG. 4 corresponds therefore essentially to the configuration in FIG. 2, however with the difference that the check valve movable closing member 26 is not held in its initial position anymore and fulfills therefore its check valve function. Any attempt of refilling the cylinder will be a failure for the flow of gas from the outlet to the inlet will be blocked at the check valve 18.

The invention claimed is:

1. A valve for a compressed gas cylinder, said valve comprising:
   a valve body with an inlet, an outlet and a passage connecting the inlet with the outlet; and
   a shut-off device of the passage including an actuating pin extending in the passage, a movable shut-off closing member, a shut-off seat in the passage and a spring urging the closing member towards the shut-off seat in a direction of service gas flow from the inlet to the outlet, wherein the pin is screwed to the movable shut-off closing member.

2. The valve according to claim 1, wherein the shut-off seat is formed by a toroid elastomer gasket housed in an annular recess in the valve body, the pin extending through and being in contact with the gasket.

3. The valve according to claim 2, wherein a main direction of a cross-sectional profile of the annular recess in the body forms with a longitudinal axis an angle α comprised between 20° and 70° and is directed to the outlet.

4. The valve of claim 3, wherein the angle α is comprised between 30° and 60°.

5. The valve according to claim 3, wherein the annular recess is formed in a bevelled section of a cavity forming the gas passage.

6. The valve according to claim 1 wherein the movable shut-off closing member comprises a sleeve with a front end contacting the shut-off seat.

7. The valve according to claim 6, wherein the pin traverses the sleeve and is rigidly fixed thereto.

8. The valve according to claim 7, wherein the pin comprises a shoulder abutting an internal shoulder in the sleeve.

9. The valve according to claim 7, wherein the pin comprises an annular slot housing a gasket in contact with an internal surface of the sleeve.

10. The valve according to claim 6, wherein the pin comprises an axial central bore extending from an open end forming the outlet to an intermediate position, and at least one transversal aperture connecting the bore with a chamber between the sleeve and the pin.

11. The valve according to claim 1, wherein the sleeve comprises an external shoulder designed for abutting an internal shoulder in the passage when the movable shut-off closing member contacts and deforms the shut-off seat beyond a predetermined stroke.

12. The valve according to claim 1 further comprising a check-valve between the shut-off device and the inlet, the check valve comprising a seat and a movable closing member initially held at a position distant from the seat by contact with a guiding surface and movable past the position by the pin so as to cooperate with the seat and prevent a refilling flow of gas from the outlet to the inlet.

13. The valve according to claim 12, wherein the guiding surface is on a tubular portion attached to the valve body and comprises at least one radial aperture so as to allow the refilling flow of gas to by-pass the closing member when in the distant position.

14. The valve according to claim 13, wherein the tubular portion is on a plug comprising the check valve seat and the inlet, the plug being screwed on the valve body.

15. The valve according to claim 14, wherein the passage comprises an axially elongated cavity that is closed at one end by the plug, the cavity being larger than the tubular portion so as to form an annular chamber around a portion for feeding the radial aperture(s).

16. The valve according to claim 12, wherein the check valve closing member is held in the position distant from the check valve seat by friction with the guiding surface.

17. The valve according to claim 16, wherein the guiding surface is cylindrical at the position where the check valve closing member is distant from the check valve seat.

18. The valve according to claim 12, wherein the check valve closing member has a bevelled front face directed to the check valve seat and a cylindrical end face opposed to the front face.

19. The valve according to claim 18, wherein the check valve comprises a spring slip on the cylindrical end face of the check valve closing member and abutting the shut-off device.

20. The valve according to claim 12, wherein the check valve and the shut-off device are configured so that the shut-off device opens and the check valve movable closing member keeps held in its initial distant position when the pin is moved on a partial stroke and the shut-off device opens further and the check valve movable closing member is pushed beyond and freed from its distant position when the pin is moved on a full stroke.

* * * * *